Nov. 24, 1959 W. W. FRITSCHI ET AL 2,914,617

MAGNETIC CORE CIRCUITS

Filed April 13, 1956 3 Sheets-Sheet 1

INVENTORS W. W. FRITSCHI
A. WEAVER
BY

ATTORNEY

Nov. 24, 1959 W. W. FRITSCHI ET AL 2,914,617

MAGNETIC CORE CIRCUITS

Filed April 13, 1956 3 Sheets-Sheet 2

INVENTORS W. W. FRITSCHI
A. WEAVER
BY [signature]
ATTORNEY

Nov. 24, 1959 W. W. FRITSCHI ET AL 2,914,617

MAGNETIC CORE CIRCUITS

Filed April 13, 1956 3 Sheets-Sheet 3

INVENTORS W. W. FRITSCHI
A. WEAVER
BY James W. Falk
ATTORNEY

United States Patent Office 2,914,617

Patented Nov. 24, 1959

2,914,617

MAGNETIC CORE CIRCUITS

Walter W. Fritschi, Bayside, and Allan Weaver, Port Washington, N.Y., assignors to Bell Telephone Laboratories, Incorporated, New York, N.Y., a corporation of New York Application April 13, 1956, Serial No. 578,112

22 Claims. (Cl. 179—18)

This invention relates to scanning and storage circuits and more particularly to such circuits which are adapted for use in conjunction with the detection and storing of subscriber line condition information in telephone systems.

In an automatic telephone system, it is often highly desirable that control components at a central office have immediately available information regarding the supervisory state of each subscriber line or trunk circuit terminating at the central office. A line scanner for providing this information must be adapted to detect changes in the supervisory state and must operate with sufficient rapidity that any changes due to the manipulation of the switch hook or dial pulsing, for example, in any or all of the lines or trunks with which the scanner is associated will be detected and subsequently stored in a common memory. In order to have constantly available for control purposes at the central office information as to the condition of each of the lines, it has been found that one examination of each line every 0.1 second is sufficiently frequent if the lines or trunks are in a static condition, that is, either in the idle or in the busy state. However, where dial pulsing is performed at the subscriber stations a somewhat more frequent examination of each line must be made in order to distinguish between the succession of line interruptions. A frequency of one examination of each line every 0.005 second has been found desirable properly to detect this dialing operation with a nominal dialing speed of 20 pulses per second. Assuming a 1000 line office the duration of time allowable for each individual scan is very limited, the time for a complete scan operation being of the order of 2 or 3 microseconds.

The extremely high frequency of scanning of the lines to present a constant picture of subscriber line conditions obviously renders any known mechanical method of accomplishing this function highly impracticable. Electronic scanning methods for scanning subscriber lines heretofore known also present limitations from the viewpoint of dependability and economy. In one specific, known electronic method, for example, failure of a single critical component associated with a plurality of subscriber lines renders all of the associated lines silent with respect to the scanner.

In addition, known scanning arrangements have required that external means be provided for storing the result of each scan of each line for purposes of properly reading the succeeding scan of each line. The reading may then be stored in a common memory at the central office.

Accordingly, it is an object of this invention to facilitate the determination of the supervisory condition of a large number of lines in a signaling system at a high rate and with a high degree of reliability.

It is another object of this invention to provide means for scanning subscriber lines of a telephone system which at the same time provides for the storage of the information obtained by the scanning operation.

It is another object of this invention to scan all of the subscriber lines in a telephone system central office at a sufficiently high rate to detect every change in line condition including line interruptions caused by dial pulsing.

A further object of this invention is to scan all of the subscriber lines in a telephone system central office by applying switching currents to magnetic cores individually associated with each subscriber line and storing the information thus gained in the magnetic cores.

These and other objects of this invention are realized in one specific illustrative embodiment of this invention by the provision of a magnetic core matrix, each core of which is individually associated with a subscriber line. Initially each core has a remanent magnetization in one direction, the particular polarity being associated with a particular line condition, that is, either idle or busy. The idle condition normally would be a condition wherein the line circuit is open and the busy condition one wherein the line circuit is closed. Each subscriber line has associated with it two sources of potential, one of which is applied to the magnetic core during the time in which the subscriber line is in one condition magnetically to bias the core in the direction of the remanent magnetization. When the subscriber line assumes the other condition, that is, moves from either the open or closed condition to the alternative condition, the first source of potential is disconnected and the second source of potential is applied to bias the magnetic core in the opposite direction from the remanent magnetization. As a result of this change and concomitant reversal of bias, the remanent magnetization of the particular core has now moved in the direction of the opposite polarity of remanent magnetization. The particular magnetic core is now in readiness to report a change of line condition to the scanning means.

The actual scanning is accomplished by the concurrent application of one-fourth of the switching current necessary to switch a core to each of three coincident switching leads defining the particular core, that is, to each coordinate switching lead and to a diagonal switching lead. The remaining one-fourth of the switching current has already been applied under the control of the subscriber line partially to switch the core to the opposite polarity of remanent magnetization. The particular core now switches its remanent polarity and an output signal is induced in a read-out lead common to all of the cores of the matrix. The fact that an output signal is produced is indicative of the fact that a change in line condition has occurred since the last scan of the particular core under consideration, however, without indicating the direction of the particular change.

The direction of the particular change noted is indicated by the polarity of the signal induced in the read-out lead. If no change in line condition has occurred since the previous scan of the particular core, the first source of potential will remain in control and continue to bias the core in the direction of remanent magnetization indicating the current status of the associated subscriber line, that is either idle or busy. The latter bias insures that upon the application of the concurrent switching currents above described, the particular core under consideration will not switch its remanent polarity. As a result no signal will be induced in the read-out lead thereby indicating that no change in subscriber line condition has occurred since the previous interrogation of the core. Availability of information regarding the condition of the subscriber line during the previous interrogation will resolve any ambiguity as to which condition of the line is indicated by the fact of no signal output during a scan.

In accordance with one feature of this invention, the magnetic cores are associated with the respective subscriber lines by means of a pair of windings, each winding having a source of current connected thereto, the windings and sources of current being so arranged that each source will magnetically bias a particular core in a different direction as determined by whether or not the line condition is one normally associated with the particular remanent polarity existing at the time the current is applied to a winding. The sources of current may advantageously be different taps on the office battery normally connected in a closed subscriber line circuit. Thus, during the open line condition current from one of the taps will flow in one of the windings and during the closed line condition current from the entire battery will flow in the other of the windings, the current flowing in opposite directions as described above.

In conjunction with the foregoing feature, another feature of this invention is presented in the means for switching the currents from one of the windings to the other and for regulating the magnitude of the currents through the windings in order to insure the proper biases to indicate the subscriber line conditions. To provide a bias for the core indicating that the subscriber line is open, or idle, one terminal of the office battery is connected to the winding through a resistor and current normally flows through the winding and through a varistor back to the tap in the office battery. The other winding for producing an opposite bias shunts this circuit with an oppositely-poled varistor for preventing current flow through the second winding at this time. When the subscriber line circuit is closed, or becomes busy, current flow through the resistor, which is common to the line loop, back-biases the first varistor and unbiases the shunting varistor, thereby cutting off current flow through the first winding, the line current now passing through the second winding. The latter winding provides a core bias indicating a change to a busy condition of the subscriber line. Magnitude of the line current through the second winding is regulated to insure a proper degree of bias by shunting line current in excess of that necessary to provide this bias through the unbiased varistor shunting the second winding.

According to another feature of this invention, the sequential scanning operation is accomplished by means of a magnetic core matrix, each core of which has an input from one of the associated subscriber lines. A switching lead for each row, column, and diagonal provides the means whereby switching currents are applied to the cores, a particular core being switched when the currents on the switching leads for that core coincide. Thus by properly controlling the sequence of coincidence of the switching currents, sequential scanning is accomplished along any coordinate or along the diagonals in any direction.

The employment of a magnetic core matrix for accomplishing the scanning operation also is highly advantageous for adaptation for use with the scanner of means for identifying the particular line being scanned and for translating the binary representation of this particular line into the corresponding decimal number designations. Although not an integral part of this invention, such means together with similar means for verifying the particular line being interrogated are readily envisioned by one skilled in the art and may advantageously comprise an arrangement of additional coordinate read-out leads defining each core. In practice read-out leads may be threaded through selected cores in any manner as may be determined by the particular code desired and may, by way of illustration, be in the fashion of that disclosed in the copending application of G. F. Abbott, Jr., Serial No. 530,181, of August 23, 1955, now Patent No. 2,843,838, issued July 15, 1958. In addition, if, as is the case in one illustrative embodiment of this invention to be more specifically described hereinafter, magnetic core pulse driving means are utilized to provide pulsed switching currents, such means may also comprise read-out leads identified with each of the output driving cores for producing pulses for the particular rows and columns of the matrix.

A more complete understanding of this invention together with the features thereof can be gained from a consideration of the following detailed description when taken in connection with the accompanying drawing, in which.

Figure 3:
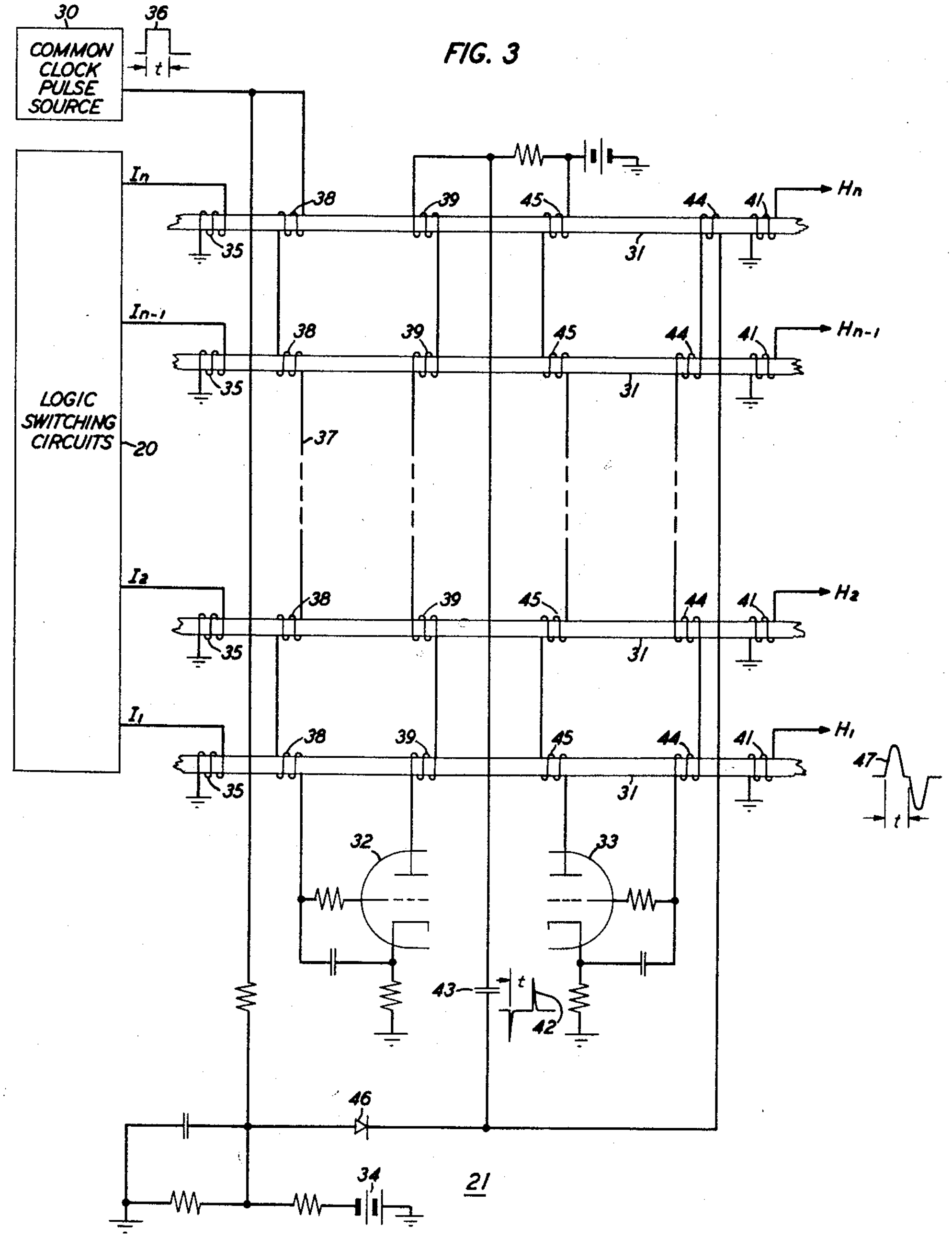
Figure 4:
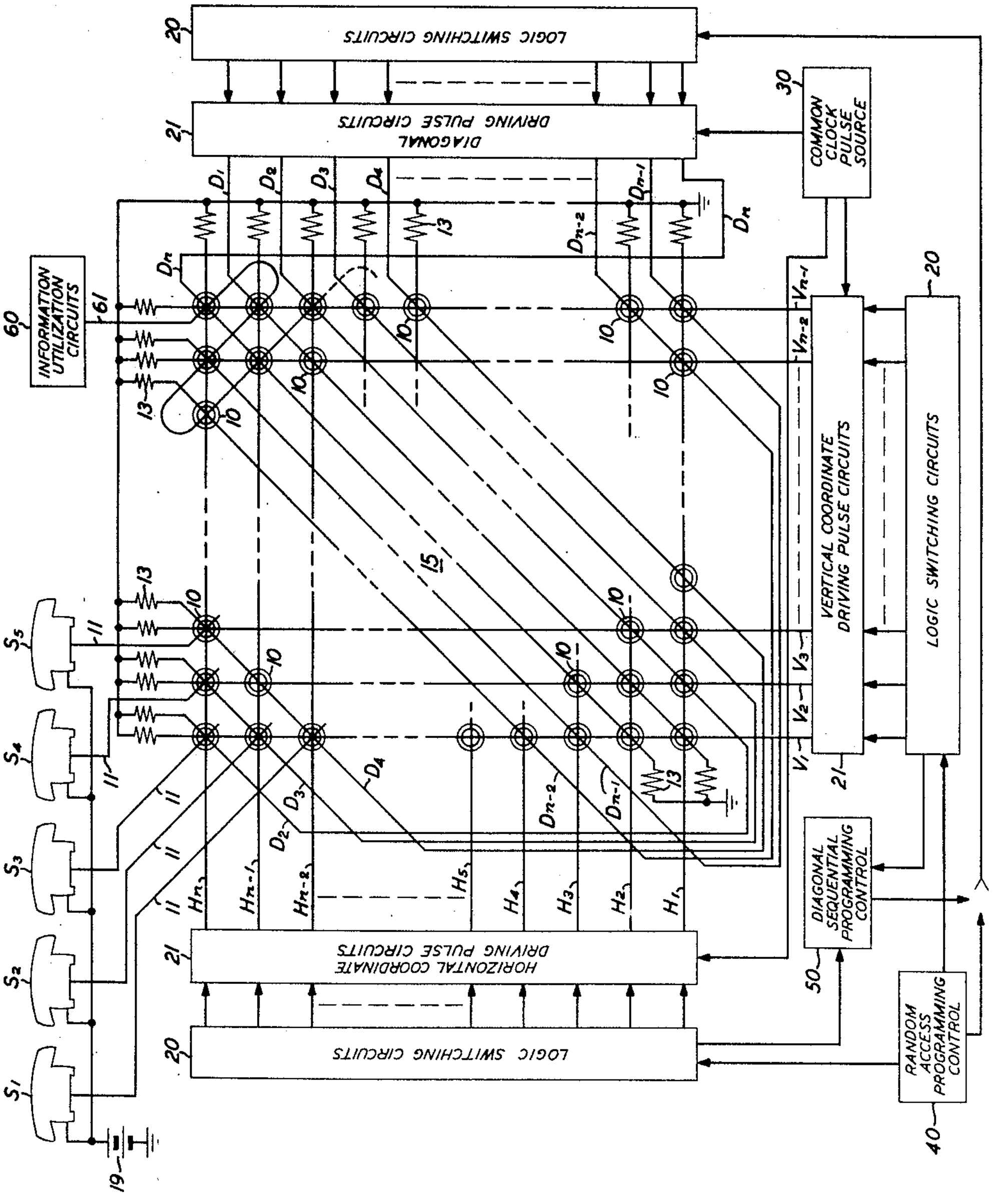

Fig. 3 is a schematic diagram of an illustrative pulse driving circuit which may be employed to provide switching currents for each plurality of horizontal, vertical, and diagonal switching leads in specific illustrative embodiments of this invention; and Fig. 4 is a schematic representation of one specific illustrative embodiment of a subscriber line scanning system in accordance with this invention showing particularly the relationship of the matrix and the control and logic circuits.

Figure 2:
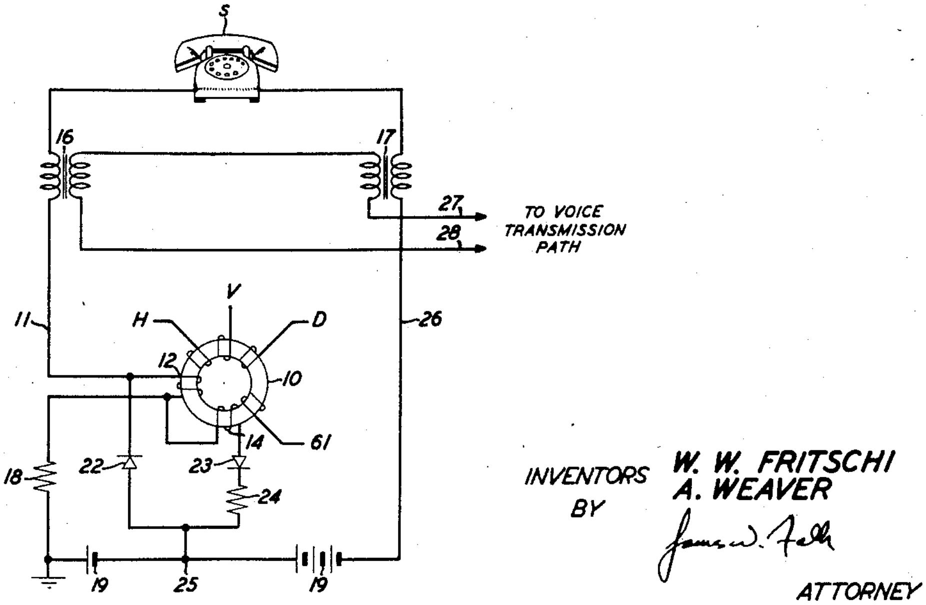
Fig. 2 is a schematic diagram of a representative telephone subscriber line circuit showing one manner of relating a magnetic core with the circuit according to the teaching of this invention.

Referring now to Figs. 2 and 4 of the drawing, each of the subscriber substations, of which the stations $S_1$ through $S_5$ are shown, is seen to be connected to a magnetic core 10 by means of a conductor 11 and a winding 12. The cores 10 are arranged in rows and columns to form a matrix 15, in which, for convenience in accomplishing sequential scanning along diagonals of the matrix more particularly to be described hereinafter, $n$ horizontal rows and $n-1$ vertical columns of cores 10 are provided. In the illustrative embodiment of this invention being described, 32 of such vertical columns and 31 of such horizontal rows make up a matrix 15 containing 992 cores thereby representing a 992 line unit in this case. A typical central office may therefore consist of a multiple of such units or a single unit with additional rows and columns. The rows of horizontal cores 10 have individually associated therewith the switching conductors $H_1$, $H_2$, $H_3$, . . ., $H_n$ and the vertical columns have individually associated therewith the switching conductors $V_1$, $V_2$, $V_3$, . . ., $V_{n-1}$. Also associated with the diagonals of the matrix 15 are the diagonal switching conductors $D_1$, $D_2$, $D_3$, . . ., $D_n$. Each of the switching conductors is terminated in a resistance 13. A single read-out conductor 61 is threaded through each of the cores 10 of the matrix 15 and is terminated in information utilization circuits 60, not shown or described herein but which may conveniently comprise any circuits utilizing sequences of positive, negative, or zero pulses.

Switching currents for the horizontal and vertical coordinate switching conductors and for the diagonal switching conductors are provided by driving pulse circuits 21 which may be as shown more specifically in Fig. 3 of the drawing and to be more particularly described hereinafter. Suitable pulse source and logic circuits 20 are connected to each of the pulse driving circuits 21 and may conveniently comprise magnetic core shift registers well known in the art. In order that coincident switching currents may be properly applied to accomplish a desired sequential scanning, in this illustrative embodiment, along diagonals, a diagonal sequential scan programming control 50 as controlled by the logic circuits 20 for the coordinate switching conductors which in turn control the logic circuits for the diagonal switching conductors is further assumed. In order that random access may also be had to desired magnetic cores and thereby its associated subscriber line, additional random access programming control means 40 may also be provided. This latter means 40 is seen in the diagram of Fig. 4 as centrally controlling the operation of the logic circuits 20 for the horizontal and vertical coordinate switching conductors and the diagonal switching conductors. To properly time the three pulse driving circuits 20 a common clock pulse source 30 is also provided.

As hereinbefore noted a representative subscriber line circuit such as that depicted in Fig. 2 is connected to a magnetic core 10 of the matrix 15 by means of a winding 12 on the core. The subscriber line circuit may be traced as follows: from the substation S, primary of the transformer 16, conductor 11, winding 12, resistor 18, office battery 19, conductor 26, secondary of the transformer 17, and return to the subscriber substation S. A varistor 22 is connected from a point on the subscriber side of the winding 12 to a tap 25 of the office battery 19 and is so poled as to pass current only in the direction of the normal line current flow. A second winding 14 is further provided for the core 10 and is connected from the resistor 18 side of the winding 12 through a second varistor 23 oppositely poled from that of the varistor 22 and a resistor 24 to the tap 25 of the office battery 19. The conductors 27 and 28 connected to the primary and secondary of the transformers 17 and 16, respectively, may be connected to a voice transmission path, not shown. The horizontal, vertical and diagonal switching conductors, H, V, and D, respectively, together with the read-out conductor 61 are also shown as wound on the core 10.

Figure 1:
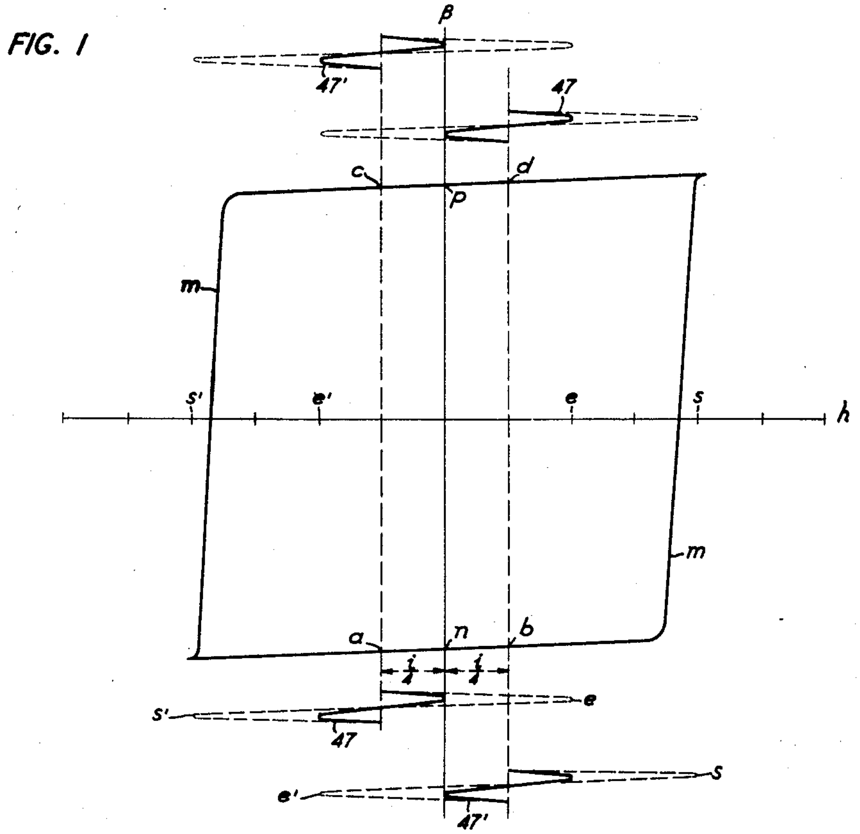
Fig. 1 illustrates the hysteresis characteristic curve of a type of magnetic core most advantageously employed with this invention and the points thereon at which various operations of this invention occur.

As was noted earlier herein, the subscriber line condition, namely, that of idle or busy, does not of itself produce an output signal on the read-out conductor 61, but a change from one condition to the other merely primes or biases its associated magnetic core so that on the next interrogation of that particular core as controlled by the scan programming, an output signal indicative of the change in line condition, will be produced. Fig. 1 depicts a typical hysteresis characteristic curve *m* of the type of magnetic core advantageously used with this invention. It will be assumed for the purposes of this description that a subscriber line core is magnetized to a position of negative remanent polarity indicated as point *a* on the curve *m* of Fig. 1, during its normally open or idle condition and magnetized to a condition of positive remanent polarity designated as point *d* on the curve *m* during its busy or closed condition. During the idle line condition a curent will flow through the winding 14 of the core 10 of Fig. 2 along a circuit which may be traced as follows: the positive side of the office battery 19, resistor 18, the winding 14, the varistor 23, the resistor 24 and the tap 25 of the office battery 19. The winding 14 is understood to be in a sense such that the magnetic core will be magnetically biased in a reverse direction to the point on the curve *m* indicated as *a*. When a change in line condition occurs, in this case, from an open to a closed condition, the line circuit will be completed at the hook-switch contacts of the subscriber substation S and line current will now flow from the positive side of the office battery 19 through the resistor 18, the winding 12, and through the conductor 11 to the subscriber. Current will also flow through the shunt path connected between the tap 25 of the office battery 19 and one side of the winding 12 and including the varistor 22. Normally, current through the winding 12, when the line is idle or open, is blocked by the varistor 22. When the normal line current flows through the winding 12 upon the closure of the subscriber line circuit, the voltage drop across the resistor 18 effects a back-biasing of the varistor 23 in a manner such as to prevent any current flow through the winding 14. The biasing of the core thereby shifts from the winding 14 to the winding 12, the latter being in a sense such as to bias the core in a forward direction to a point on the curve *m* of Fig. 1 designated as *b*. It should be noted, however, that the current through the winding 12 at this point is insufficient to switch the core 10 to a condition of opposite remanent polarity. Since the normal line current flowing upon closure of the circuit may be substantially more than is necessary to raise the magnetic bias to the point *b* of Fig. 1, the varistor 22 effectively provides a means for shunting the excess current over that required to properly bias the core 10, around the winding 12. The resistor 24 functions merely as a current overload limiter for the varistor 23 in the event of an accidental grounding.

An alternative line circuit arrangement can be provided in which the shunt path including the varistor 22 is eliminated. However, in this case, means must be provided to adjust the line circuit current to a fixed value such as, for example, by inserting loop building-out resistances in the conductors 11 and 26.

The core 10, biased now to the point *b*, is prepared to be acted upon by the switching currents appearing on the switching conductors H, V, and D.

In order to provide the necessary switching currents on the switching conductors, suitable pulse driving source circuits 21 are provided for the horizontal and vertical coordinate switching conductors and for the diagonal switching conductors. An illustrative arrangement suitable for providing properly timed switching pulses is depicted in detail in Fig. 3. Although the circuit of Fig. 3 is shown as having *n* output leads adapted to provide switching pulses for *n* horizontal coordinate switching conductors, it is to be understood that an identical arrangement is provided for the other coordinate conductors and the diagonal conductors, the only modification necessary being that of reducing the numbers of output leads to $n-1$ in the case of the vertical coordinate conductors when diagonal scanning is desired.

The specific pulse driving source circuit 21 depicted in Fig. 3 comprises a twin triode vacuum tube having a first and a second stage, 32 and 33, and a number of associated magnetic cores 31 connected in tandem. The output of the circuit 21 on any of the output leads $H_1$ through $H_n$ is an alternating-current pulse 47, the leading edge of each half being synchronized with the leading and trailing edge of a clock pulse 36 from the source 30, respectively. Normally, both tubes are biased to cut-off by a potential source 34 resulting in a substantially zero plate and grid current in each of the stages 32 and 33. It will be assumed that all of the cores 31 are in a particular condition of remanent magnetization and are held in this condition by inhibiting current applied to the windings 35 through the leads $I_1$ through $I_n$ under the switching control of the logic circuits 20. When a positive-going clock pulse 36 from the source 30 is applied via the conductor 37 to the grid of the stage 32, no switching action takes place due to the inhibiting current in the windings 35 and, although the stage 32 conducts and grid and plate currents flow through the windings 38 and 39 of the cores 31, the conduction at this time will have no effect. When, however, the inhibit current is removed from any of the cores 31, that particular core will begin to switch with a resulting regenerative action between the windings 38 and 39 causing the grid of the stage 32 to swing more positive which in turn causes the stage 32 to conduct more heavily until the point of saturation is reached. The large current through the windings 38 and 39 causes the particular core to switch to the opposite condition of remanent polarity, the particular polarity being assumed so as to induce a positive pulse in one of the output leads H by means of the winding 41. This positive pulse will be produced only during the switching time of the core even though the plate and grid currents of the stage 32 remain high for the duration of the clock pulse 36.

During the conduction of the stage 32 a negative-going charge having the wave form 42 is produced across the capacitor 43 and upon the termination of the clock pulse 36, and thereby the conduction of the stage 32, a positive-going peak is produced across the capacitor 43, This positive peak 42 is transmitted through the windings 44 to the grid of the stage 33. The stage 33 now begins to conduct and a similar action takes place by means of the regenerative effect of the windings 44 and 45 to switch the particular core back to its original state of remanent magnetization. A negative-going pulse occurring at the time of the positive-going peak 42, which in turn is controlled by the trailing edge of the pulse 36, now appears on the output lead H immediately following upon the positive pulse on the same lead. The positive and negative pulses thus produced are substantially equal in amplitude and shape. Thus it will be seen that depending upon which of the input leads has selectively removed from it the inhibiting current under the control of the associated logic circuits 20, a positive and negative switching pulse 47 will be applied to the selected switching conductor H. The diode 46 is provided in order to clamp the grid of the stage 33 to a cut-off potential during the conduction of the stage 32.

Assuming the amplitude of the output switching current 47 is of the magnitude $$\frac{i}{4}$$

as designated in the diagram of Fig. 1, the switching currents as applied to any of the coordinate or diagonal switching conductors will be applied to the bias indicated as point $a$ or point $b$ as the pulses 47 or 47'. These pulses having the magnitude $$\frac{i}{4}$$

on any one of the switching conductors will be insufficient to switch the remanent magnetization of a core at point $a$. Should switching currents of the magnitude $$\frac{i}{4}$$

be concurrently applied to any two conductors the switching effect will still be insufficient to switch the core. This is also true should the switching currents of the magnitude $$\frac{i}{4}$$

be applied concurrently to the particular ones of the horizontal and vertical coordinate switching conductors and diagonal switching conductor defining a particular core if the bias of that core resides at the point indicated as $a$ on the curve $m$ of Fig. 1. The triple coincident currents will in this case be sufficient to move the core only to the point designated as $e$ in the figure, each of the divisions on the $h$ axis being assumed to represent a current value of the magnitude $$\frac{i}{4}$$

The three concurrent switching currents $$\frac{i}{4}$$

thus applied will be insufficient to bring the remanent magnetization beyond the knee of the curve $m$.

With the removal of the concurrent currents the magnetization will return to its original position indicated as the point $a$ on the curve $m$. When, however, as described hereinbefore, a change in subscriber line condition has occurred thereby moving the magnetic bias of the core to the point $b$, in effect also applying a switching current of the magnitude $$\frac{i}{4}$$

then upon the application of triple coincident switching currents having the total magnitude $$\frac{3i}{4}$$

the magnetization of the core will be brought beyond the knee of the curve $m$ to the point designated as $s$ and the core will be switched to its opposite condition of remanent magnetization. The bias provided by the winding 12 indicating a busy condition of the subscriber line, in this case, will now appear as an inhibiting bias designated as point $d$ on the curve $m$. At this point on the curve $m$, it is obvious from what has been described hereinbefore that the triple coincident currents totaling a magnitude of $$\frac{3i}{4}$$

of the opposite polarity will be insufficient to again switch the core, the coincident currents merely moving the condition of remanent magnetization to the point designated as $e'$ on the $h$ axis. Assuming as above, that the remanent magnetization of the particular core under consideration now represents a busy condition of the subscriber line, upon the interrogation of this core, that is, the application of a pulse of the magnitude of $$\frac{i}{4}$$

applied to each of the switching conductors defining the particular core, the core will not at that time be switched. However., should a change in subscriber line condition have occurred, that is, a change from the busy to the idle condition, the winding 14 of the core will then again resume the biasing of the core which will move the bias from the point designated as $d$ on the curve $m$ to the point designated as $c$ on the curve $m$. Subsequent coincident currents of the magnitude $$\frac{i}{4}$$

applied concurrently to the switching conductors defining the particular core will be sufficient when added to the bias at the point $c$ to move the magnetization of the core to the point designated as $s'$ and to switch the core back to its original condition of remanent magnetization.

A common read-out lead 61 is threaded through all of the cores of the matrix and when any core of the matrix is switched an output pulse will be induced in the read-out lead 61, the polarity of the output pulse being determined by the direction of the switching of the particular core. A signal of either polarity on the output of the read-out lead 61 is indicative therefore of a change in subscriber line condition either from the idle to the busy or from the busy to the idle condition, the polarity of the signal determining the particular change which has occurred. Upon the interrogation of any particular core no signal on the read-out lead 61 indicating that the core has not been switched will therefore indicate that no change has occurred in the condition of the subscriber line since the preceding interrogation, that is, the subscriber line was idle and still is or was busy and still is. The ambiguity thus apparent in a no-signal reading is readily resolved upon the comparison of this reading with the last reading resulting from an actual switching of the particular core in question in associated information utilization components.

The application to the switching conductors from the pulse driving circuits 21 of an alternating pulse advantageously performs in addition to supplying pulses of the necessary polarity to effect the switching of the core, the additional function of returning the core to its original position of remanent polarity after minor excursions due to the additive effect of partial applied switching currents. Any particular core in the matrix is subject to many more single nonswitching current pulses than coincident switching pulses. When nonswitching pulses are of single polarity and in such a direction as to tend to switch the core, the net effect will be such as to diminish the remanent magnetization to a degree dependent upon the rectangularity of the hysteresis characteristic curve of the core in question. The means employed in this invention of meeting this cumulative destruction of stored information is always to complete the minor hysteresis loop excursion. Each switching current pulse therefore, being of opposite polarities, excites the core in both directions, the core magnetization thereby being decreased only to an asymptotic value close to the original value even for an infinite number of minor closed loop excursions.

In an illustrative embodiment of this invention, a desirable sequence of interrogation of the magnetic cores associated with the subscriber lines has been found to be along the diagonal switching conductors. Thus, referring to the schematic representation of Fig. 4, the first core to be interrogated will be the core identified by the coordinates $H_1$ and $V_1$, concurrent switching currents being therefore applied to the switching conductors $H_1$, $V_1$, and $D_1$ by the driving pulse circuits 21. The second core to be interrogated will be the one defined by the switching conductors $H_2$ and $V_2$, and concurrent switching currents will be applied to these conductors and once again to $D_1$. This procedure will be continued until the core identified by the conductors $H_{n-1}$ and $V_{n-1}$ is reached, at which point concurrent switching currents will be applied at these conductors and once more to the conductor $D_{n-1}$. Following this, a switching current pulse will be applied to the last horizontal conductor, $H_n$, again to the first of the vertical switching conductors $V_1$, and for the first time to the diagonal switching conductor $D_2$. The core therefore defined by the conductors $H_n$ and $V_1$ will be interrogated. The remaining cores along the diagonal conductor $D_2$ will now be sequentially interrogated in a similar fashion by applying simultaneous switching current successively on the conductors $H_1$, $H_2$, $H_3$, $H_4$, $H_5$, . . . and $H_{n-2}$, and conductors $V_2$, $V_3$, . . . $V_{n-2}$ and $V_{n-1}$, respectively, at the same time that a concurrent series of switching current pulses are applied to the diagonal switching conductor $D_2$. This process is repeated with the next series of pulses applied to the diagonal switching conductor $D_3$ concurrently with concurrent successive pulses applied to the horizontal and vertical conductors beginning with the conductors $H_{n-1}$ and $V_1$, respectively, until all of the cores of the matrix have been thus interrogated.

A still further advantage of providing a switching current for the various switching conductors of bipolar pulses is seen in the problem which arises from the fact that in matrices, such as those described, the ratio of the output pulse from the disturbed but unswitched cores to the output pulse from the single switch core is unavoidably large. A commonly used remedial measure is to alternately thread the cores of the matrix in opposite directions so that the unwanted pulses tend to balance each other out. In the present invention, this can be accomplished without losing the significance of the polarity of the output pulse by also reversing the direction of busy and idle bias windings on alternate cores. With symmetrical positive and negative drive pulses applied in sequence, this would merely mean that for each of the cores the positive half of the driving pulse will switch a core from a particular position of remanent magnetization to the other position of remanent magnetization. Each of the other half of the cores in the matrix will be switched by the negative half of the driving pulse for the identical line change.

It is to be understood that the above-described arrangements are but illustrative of the application of the principles of the invention. Numerous other arrangements may be devised by those skilled in the art without departing from the spirit and scope of the invention.

What is claimed is:

1. In a signaling system, in combination, a transmission line having a first and a second electrical condition, a magnetic core having an initial magnetization in one direction, a first and a second winding inductively coupled to said core, said windings being connected with said line, means including said first winding for applying a magnetic bias in said one direction to said core determined by one of said line conditions, means including said second winding for applying a magnetic bias in the opposite direction to said core determined by the other of said line conditions, and means for adding a magnetic flux to said biases to switch the direction of said magnetization of said core when said bias is in said opposite direction.

2. In a signaling system, in combination, a transmission line having a first and a second electrical condition, a magnetic core having an initial magnetization in one direction, a first and a second winding inductively coupled to said core, said windings being connected with said line, means including said first winding for applying a magnetic bias in said one direction to said core determined by one of said line conditions, means including said second winding for applying a magnetic bias in the opposite direction to said core responsive to a change from said one to the other of said line conditions, means for adding a magnetic flux to said biases to switch the direction of said magnetization of said core when said bias is in said opposite direction, output circuit means, and means for inducing a signal in said output circut means responsive to said core switching indicative of said change from said one to the other of said line conditions.

3. In a signaling system, in combination, a transmission line having a first and a second electrical condition, a magnetic core having an initial magnetization in one direction, a plurality of windings inductively coupled to said core, one of said windings being connected with said line, means for applying partial switching currents to others of said windings, means for applying a biasing current to said one of said windings for magnetically biasing said core in the opposite direction responsive to a change from one of said line conditions to the other of said conditions, the concurrence of said partial switching currents when said core is magnetically biased in said opposite direction switching the direction of said magnetization of said core, and means for obtaining an output signal responsive to said core switching indicative of said line condition change.

4. In a signaling system, in combination, a transmission line having a first and a second electrical condition, a magnetic core having an initial remanent magnetization, a plurality of windings inductively coupled to said core, means for applying a disabling current to one of said windings responsive to either of said line conditions, means for applying an enabling current to a second of said windings responsive to a change from one of said line conditions to the other of said conditions, means for applying switching currents to others of said windings, the remanent magnetization of said core being switched on the occurrence of said switching currents and said enabling current, and means for obtaining an output signal indicative of said change of line condition on switching of said core.

5. In a signaling system, in combination, a transmission line having a first and a second electrical condition, a magnetic core having an initial remanent magnetization, a plurality of windings inductively coupled to said core, certain of said windings being connected with said line, means for applying a first biasing current to one of said windings responsive to either of said line conditions, and means for applying a second biasing current to another of said windings responsive to a change from one of said line conditions to the other of said conditions.

6. In a signaling system according to claim 5, in combination, means for applying additional current to others of said windings, said additional current and second biasing current in said windings switching the magnetic state of said core, and output circuit means energized responsive to said core switching for producing an output signal indicative of said change in line condition.

7. In a signaling system according to claim 5, in combination, means for applying switching currents to others of said windings, said first biasing current preventing the switching of said core by said switching currents and said second biasing current enabling the switching of said core by said switching currents.

8. In a telephone system, in combination, a plurality of subscriber lines, a plurality of magnetic cores individually associated with said lines, means for magnetically biasing particular ones of said cores responsive to changes in the electrical condition of said associated subscriber lines, input leads associated with said cores, means for applying switching currents to said leads, means including windings inductively coupled to said cores and connected to said input leads for switching said particular ones of said cores responsive to the coincidence of said switching currents and said magnetic bias, and a read-out lead common to all of said cores.

9. In a telephone system, in combination, a plurality of subscriber lines each having a possible open or a closed electrical condition, a plurality of magnetic cores having an initial remanent magnetization, a plurality of windings inductively coupled to each of said cores, each of said lines being individually connected with first windings of one of said cores, input leads connected respectively with other windings of each of said cores, means for applying switching currents to said leads, means for applying disabling currents to said first windings of said cores responsive to either of said conditions of said connected lines for preventing the switching of said cores, means for applying enabling currents to said first windings of said cores responsive to changes from one of said conditions to the other of said conditions for switching the magnetization of said cores, and a read-out lead common to all of said cores.

10. In a telephone system, in combination, a magnetic core having an initial remanent magnetization, a subscriber line, a first winding for said core, a source of current connected to said first winding for biasing said core responsive to one condition of said line, a second winding for said core, a second source of current connected to said second winding for oppositely biasing said core responsive to another condition of said line, means for applying switching currents to said core for switching said core only when said biasing opposes said initial remanent magnetization, and a read-out lead associated with said core.

11. A magnetic core circuit comprising a magnetic core having a substantially rectangular hysteresis loop and having a pair of bias windings thereon, means for applying current selectively to only one of said windings to bias said core, means including other windings on said core for applying partial energizing currents to said core, said partial energizing currents alone being insufficient to switch the magnetic state of said core but together with current through one of said bias windings being sufficient to switch the state of said core, and means including another winding on said core for detecting the switching of the magnetic state of said core.

12. A magnetic core circuit comprising a magnetic core having a substantially rectangular hysteresis loop and having a pair of bias windings thereon, means for alternatively applying current to said bias windings to bias said core to one of two points on said hysteresis loop, means including other windings on said core for applying partial switching currents to said core, said partial switching currents alone being insufficient to switch the magnetic state of said core but being sufficient to switch the magnetic state of said core when said core has been biased to a predetermined one of said two points, and means including another winding on said core for detecting the switching of the magnetic state of said core.

13. A magnetic core circuit comprising a magnetic core having an initial magnetization, signaling means associated with said core, a pair of bias windings on said core, means for selectively energizing said bias windings responsive to either of two signals of said signaling means to bias said magnetization of said core to a predetermined point in one direction, other windings for said core, means for energizing said other windings to switch the magnetization of said core when the magnetic effects of said bias and last-mentioned energizing means are additive and opposite in direction to that of said initial magnetization, and means connected to said core for detecting said switch of magnetization of said core.

14. A magnetic core circuit comprising a magnetic core having an initial remanent magnetization, a pair of bias windings for said core, means for selectively applying current to either of said bias windings, activating windings for said core, and means for applying current to said activating windings, said bias windings wound so that current through a predetermined one of said bias windings together with current through said activating winding switches said remanent magnetization of said core.

15. A magnetic core circuit according to claim 14 in which current through the other of said bias windings prevents the current through said activating winding from switching the remanent magnetization of said core.

16. A magnetic core circuit comprising a magnetic core having an initial magnetization of one polarity, means including activating windings for applying a partial switching magnetization to said core, a pair of biasing windings for said core, a first circuit including one of said biasing windings and a current source energized to apply inhibiting magnetization to said core, a second circuit including the other of said biasing windings and a current source energized to apply an enabling magnetization to said core, means for selectively controlling the energizing of said first and said second circuits, said core having magnetic characteristics such that said partial switching magnetization together with said enabling magnetization switches said core to a magnetization of the opposite polarity, and output circuit means including an output winding for said core energized responsive to the switching of said core.

17. A magnetic core circuit comprising a magnetic core capable of switching from one to another state of remanent magnetization, a pair of windings for said core, an energizing circuit having a pair of parallel branches respectively including said pair of windings, current source means, and means for selectively switching said current source means from one to the other of said branches, said windings being wound such that current through one of said windings inhibits the switching of said core and current through the other of said windings enables the switching of said core.

18. A magnetic core circuit according to claim 17, also comprising activating windings for said core, and means for applying switching currents to said activating windings to switch the state of remanent magnetization of said core when said core is enabled.

19. A magnetic core circuit according to claim 17 in which said switching means includes resistance means connected to one of said windings and a unilateral conducting element connected to the other of said windings.

20. A magnetic core circuit comprising a magnetic core having a substantially square hysteresis loop, a first and a second bias winding on said core, a resistor connected to one side of said first bias winding, said second bias winding being connected to said one side, an asymmetrical conducting device connected in series with said second winding, a source of potential connected to said asymmetrical conducting device, and means for applying current to said first bias winding, current normally flowing only through said second bias winding but on application of current to said first bias winding said asymmetrical conducting device being back-biased by the voltage drop across said resistor and preventing current flow through said second bias winding.

21. A magnetic core circuit in accordance with claim 20 further comprising a second asymmetrical conducting device connected across said first bias winding and said resistor.

22. In a telephone system, a plurality of subscriber lines, an array of substantially square hysteresis loop magnetic cores individually associated with said lines, a pair of bias windings on each of said cores, means for selectively applying current to said bias windings to bias said magnetic cores to one of two points on their hysteresis loops dependent on the condition of the associated lines, a plurality of other windings on each core, means for applying energizing currents to said other windings to switch the magnetic state of said cores if said cores are biased at a predetermined one of said points, and read-out wire means threading all of said cores in said array, the direction of said bias windings being opposite on alternate cores of said array.

References Cited in the file of this patent

UNITED STATES PATENTS

| | | |
|---|---|---|
| 2,709,248 | Rosenberg | May 24, 1955 |
| 2,802,202 | Lanning | Aug. 6, 1957 |